(12) United States Patent
Govil

(10) Patent No.: US 8,099,481 B2
(45) Date of Patent: Jan. 17, 2012

(54) SYSTEM AND METHOD FOR RESOLVING HUBS AND LIKE DEVICES IN NETWORK TOPOLOGY

(75) Inventor: Ravi K. Govil, Camarillo, CA (US)

(73) Assignee: Alcatel Lucent, Paris (FR)

( * ) Notice: Subject to any disclaimer, the term of this patent is extended or adjusted under 35 U.S.C. 154(b) by 1155 days.

(21) Appl. No.: 10/737,684

(22) Filed: Dec. 16, 2003

(65) Prior Publication Data
US 2005/0132026 A1    Jun. 16, 2005

(51) Int. Cl.
G06F 15/173 (2006.01)
H04L 12/26 (2006.01)
H04L 12/66 (2006.01)

(52) U.S. Cl. ......... 709/223; 709/244; 370/245; 370/353

(58) Field of Classification Search .......... 709/223, 709/238–244, 224; 370/245, 353
See application file for complete search history.

(56) References Cited

U.S. PATENT DOCUMENTS

| | | | | |
|---|---|---|---|---|
| 5,546,540 A | * | 8/1996 | White | 709/223 |
| 5,577,028 A | * | 11/1996 | Chugo et al. | 370/409 |
| 5,687,168 A | * | 11/1997 | Iwata | 370/255 |
| 5,708,772 A | * | 1/1998 | Zeldin et al. | 714/25 |
| 5,710,885 A | * | 1/1998 | Bondi | 709/224 |
| 5,715,396 A | * | 2/1998 | Chatwani et al. | 709/242 |
| 6,205,122 B1 | * | 3/2001 | Sharon et al. | 370/254 |
| 6,347,336 B1 | * | 2/2002 | Song et al. | 709/223 |
| 6,405,248 B1 | * | 6/2002 | Wood | 709/223 |
| 6,516,345 B1 | | 2/2003 | Kracht | |
| 6,633,757 B1 | * | 10/2003 | Hermann et al. | 455/414.1 |
| 6,850,486 B2 | * | 2/2005 | Saleh et al. | 370/218 |
| 7,315,985 B1 | * | 1/2008 | Gauvin et al. | 715/734 |
| 2002/0032761 A1 | * | 3/2002 | Aoyagi et al. | 709/223 |
| 2003/0020976 A1 | * | 1/2003 | Krishnaswamy et al. | 359/110 |
| 2003/0033446 A1 | * | 2/2003 | Noden | 709/328 |
| 2003/0097438 A1 | * | 5/2003 | Bearden et al. | 709/224 |
| 2003/0212781 A1 | * | 11/2003 | Kaneda et al. | 709/223 |
| 2004/0047300 A1 | * | 3/2004 | Enomoto et al. | 370/256 |
| 2004/0218525 A1 | * | 11/2004 | Elie-Dit-Cosaque et al. | 370/223 |
| 2005/0111350 A1 | * | 5/2005 | Kano | 370/216 |
| 2006/0187017 A1 | * | 8/2006 | Kulesz et al. | 340/506 |

FOREIGN PATENT DOCUMENTS
EP    0887731 A1 * 12/1998

* cited by examiner

*Primary Examiner* — Kenny Lin
*Assistant Examiner* — Guang Li
(74) *Attorney, Agent, or Firm* — Galasso & Associates, L.P.

(57) ABSTRACT

The present system and method for resolving hubs and other forms of relay devices in a subnet preferably comprises the steps of acquiring the adjacency table of each of the plurality of nodes, searching the adjacency table data for indications that a port is indirectly coupled to a plurality of other nodes through a hub, introducing an icon for each of the hubs in addition to icons for each of the plurality of nodes enabled with an adjacency-detection protocol, and logically coupling each hub to the associated nodes. Illustrations of the network topology generated using the preferred embodiment are therefore highly representative of the actual physical topology.

13 Claims, 5 Drawing Sheets

| Local Port Id | Remote MAC | Remote Port Id |
|---|---|---|
| 3 | 00D095:1AA370 | 8 |
| A | 0020DA:F7AB90 | B |
| A | 00D095:0600B0 | C |
| A | 00D095:1B72E0 | D |
| A | 00D095:1CD430 | E |
| A | 00D095:20F5F0 | F |
| 6 | 00D095:4C8830 | 1 |

| Local Port Id | Remote MAC | Remote Port Id |
|---|---|---|
| 2 | -- | 8 |
| B | 00D095:0600D1 | A |
| B | 00D095:0600B0 | C |
| B | 00D095:1B72E0 | D |
| B | 00D095:1CD430 | E |
| B | 00D095:20F5F0 | F |
| 7 | -- | 11 |

| Local Port Id | Remote MAC | Remote Port Id |
|---|---|---|
| 5 | 00D095:1AA370 | 10 |
| C | 00D095:0600D1 | A |
| C | 0020DA:F7AB90 | B |
| C | 00D095:1B72E0 | D |
| C | 00D095:1CD430 | E |
| C | 00D095:20F5F0 | F |
| 6 | 00D095:4C8830 | 1 |

SYSTEM AND METHOD FOR RESOLVING HUBS AND LIKE DEVICES IN NETWORK TOPOLOGY

FIELD OF INVENTION

The invention relates to a system and method for identifying the presence of hubs and the like in a data network. In particular, the inventions resolves where in the network topology there are relay devices that pass along adjacency detection messages without directly responding to those messages, thereby providing a more accurate model of the network topology.

BACKGROUND

Distributed packet switched networks, including local area networks (LANs), wide area networks (WANs), metropolitan area networks (MANs), and the Internet, for example, are comprised of nodes interconnected by various transmission media. The nodes may include one or more edge devices, switches, routers, gateways, hubs, and network management systems, for example, that exchange data as well as control messages. Included in the set of control messages are the messages used to perform various switching and management functions that require knowledge of the topology of the network.

Some of the relatively more intelligent nodes are enabled with discovery processing, e.g., an adjacency detection protocol, able to detect the presence of other devices and even some operational parameters of those devices. Such network devices, herein referred to as adjacency-detection-enabled (ADE) network devices or ADE nodes, generate what are termed discovery messages to prompt similarly enabled devices to respond with identifying information. The reply to a discovery message, termed a discovery response message, generally includes the media access control (MAC) address of the responding device and the port on which the responding device received the message. A suitably enabled network device like an ADE LAN switching device, for example, periodically transmits discovery messages on each of its local ports in order to compile a database of forwarding information for the devices in proximity to the switching device.

Upon receipt of a discovery response message, a LAN switching device generally updates its adjacency table including a list of adjacent ADE devices organized as a function of the local port number. In general, two switches are adjacent if, and only if, the following two requirements are satisfied: (a) there exists a Spanning Tree path between them; and (b) there exists no ADE switch between the two switches on that Spanning Tree path.

Under most circumstances, there is a one-to-one correspondence between the local port and the adjacent device, giving rise to a single entry per port listed in the adjacency table. If there is a hub directly coupled to the local port, however, the adjacency detection software of the switch registers all those ADE devices connected to the hub as being connected to the port of the switch connected to the hub. This results in multiple entries in the adjacency table for each local port connected to the hub. The hubs themselves generally cannot be detected in a network using communication protocols, because they are passive devices that merely forward the incoming discovery messages to all other devices to which it is connected.

The adjacency tables of the various ADE network devices may also be collected by the network management system (NMS) and used to construct a visual display of the network topology. The topology display is a graphical representation that depicts the various ADE network devices interconnected by links derived from the adjacency tables of the devices themselves.

In the prior art however, the graphical representation of the network topology may differ substantially from the physical topology due to the multiplicity of apparent links between the local port of a device and the plurality of other ADE network devices indirectly coupled to the local port through the hub. As a result, the topology display may be both misleading and overly complex. A graphical display of a network topology including n switches, for example, operatively connected to a central hub by means of a single link appears as though each switch is directly linked to each of the other the (n−1) devices. In total, the topology display of such a network includes n×(n−1)/2 links in the network, substantially more than the actual n physical links.

Figure 1:
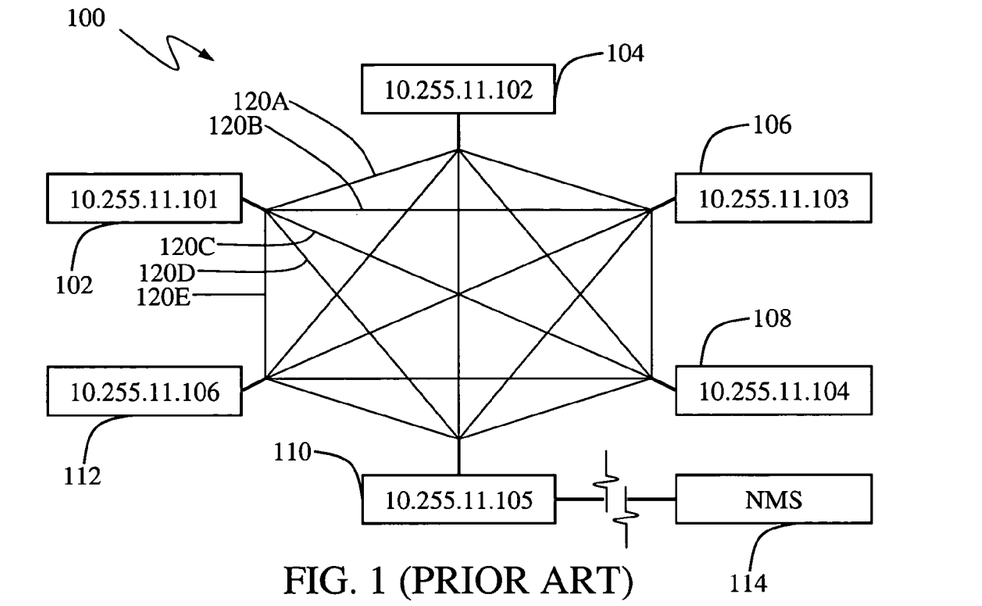
FIG. 1 is a topology display of a network including six switches directly connected to a hub, according to the prior art.

As illustrated in the prior art example of FIG. 1, a topology 100 including n=6 ADE network devices 102 through 112, gives rise to fifteen apparent links that radiate from each of the switches directly linked to a hub (not illustrated). Not only does the apparent links 120A-120E misrepresent the total number of physical links in the subnet, but the physical presence of the hub and physical connections is masked in the display.

SUMMARY

The present invention features a method and system for resolving the presence of one or more connectivity multipliers in a network. A connectivity multiplier is a network device adapted to relay adjacency detection messages without responding to them. The set of devices that qualify as a connectivity multiplier includes, but is not limited to, hubs, routers under certain circumstances, and third party devices employing incompatible adjacency detection protocols, for example. Resolution of the connectivity multipliers permits one to generate an accurate representation of a network topology including physical links that might otherwise be omitted.

The preferred embodiment of the present invention is a method of resolving a connectivity multiplier operably coupled to three of more adjacency-detection enabled (ADE) nodes, each of the three or more ADE nodes being associated with an ADE node icon. The method preferably comprises the steps of acquiring adjacency information from each of the three of more ADE nodes; identifying a pseudo-link set from the adjacency information, each unique pseudo-link set comprising at least one pseudo-link associating a pair of ADE nodes; and coupling the three of more ADE node icons via a connectivity multiplier icon.

BRIEF DESCRIPTION OF THE DRAWINGS

The present invention is illustrated by way of example and not limitation in the figures of the accompanying drawings, and in which.

DETAILED DESCRIPTION

Figure 2:
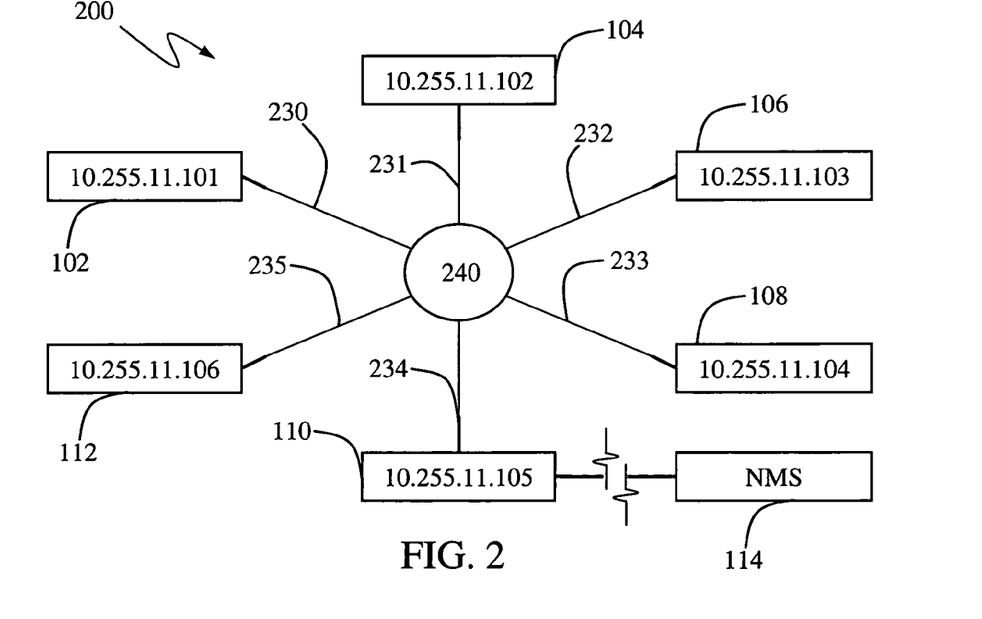
FIG. 2 is a topology display of a subnet including six ADE network nodes directly connected to a connectivity multiplier, according to the preferred embodiment of the present invention.

Illustrated in FIG. 2 is a topology display of a subnet including six adjacency-detection-enabled (ADE) node icons directly connected to a connectivity multiplier icon. The topology display 200 represents a subnet (not shown) that may be part of a larger network topology including the Internet, an intranet, a local area network (LAN), a wide area network (WAN), a metropolitan area network (MAN), or a combination thereof, for example. The topology display 200 comprises a connectivity multiplier icon 240 and a plurality of ADE node icons (ANIs) 102, 104, 106, 108, 110, 112 having consecutive IP addresses: 10.255.11.101, 10.255.11.102 to 10.255.11.106, respectively. The term icon as used herein includes graphical, symbolic, simile, and mathematical representations of a network node or link. The term ADE node as used herein refers to a network node or device that is enabled with adjacency detection protocol or functionality for purposes of generating, recognizing, and or responding to adjacency detection messages. The class of ADE nodes includes, but is not limited to, switches, routers, servers, and workstations.

Operatively coupled to the ADE node icon (ANI) 110 is a network management system (NMS) icon 114 representing an actual NMS (not shown) that is physically present in the network. The topology display 200 is preferably a graphical display viewable by a network administrator by means of a graphical user interface (GUI) at the NMS, which is described in more detail below.

The connectivity multiplier icon (CMI) 240 is the graphical representation of an actual connectivity multiplier (not shown) physically present in the subnet represented by topology display 200. The term connectivity multiplier as used herein generally refers to a node or device that re-transmits incoming adjacency detection messages to a plurality of other nodes but is not enabled with adjacency detection protocol or because the adjacency detection protocol is temporarily inoperable, non-responsive, or incompatible. The class of connectivity multipliers generally includes, but is not limited to, hubs, routers enabled with incompatible adjacency detection protocols, and other third-party devices. Incompatibilities may occur, for example, where one proprietary router, for example, implements discovery protocol different from those of an alternative proprietary router, thereby preventing the routers from recognizing or responding to the adjacency detection messages of each other. In this case, the router generally broadcasts an incoming adjacency detection message on all ports of the applicable VLAN, except the one on which it was received, thereby emulating a hub from the perspective of the ADE node from which the adjacency detection message originated.

Referring still to FIG. 2, the CMI 240 is directly connected to each of the six ANIs 102-112 by means of link icons 230-235, respectively. The link icons 230-235 actually represent physical or electromagnetic links between the ADE nodes represented by ANIs 102-112 and the connectivity multiplier represented by connectivity multiplier icon 240. The physical or electromagnetic links corresponding to link icons 230-235 may be any type of direct communication link, including wired or wireless connections. In the preferred embodiment, the link icons 230-235 are represented in the NMS GUI in the form of lines, each link icon 230-235 having a color indicating the link status of the physical network segment it represents.

Figure 3:
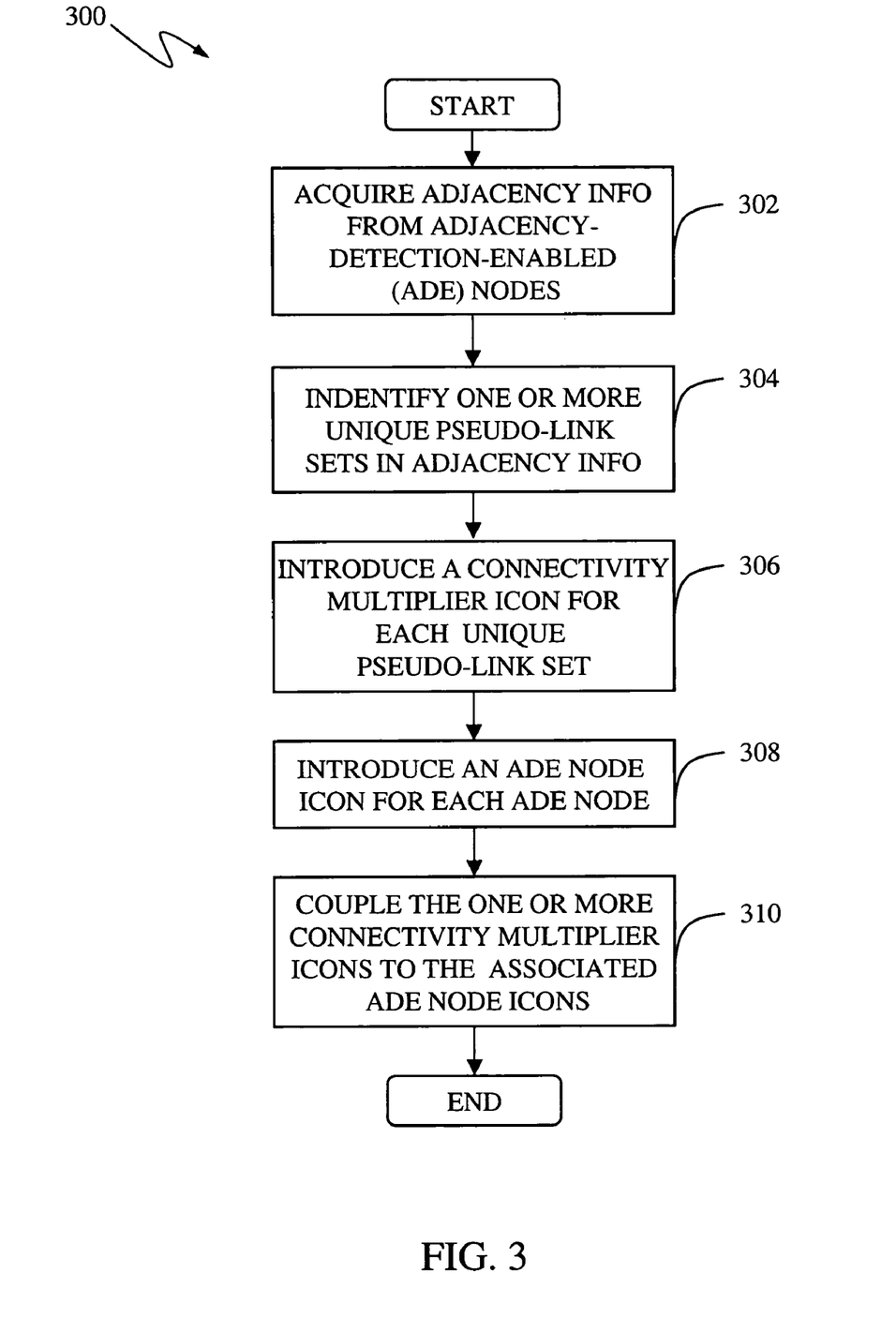
FIG. 3 is a flow chart of the method of resolving link multiplier devices, according to the preferred embodiment of the present invention.

Illustrated in FIG. 3 is the method of resolving one or more connectivity multipliers in a network 300. Using the method and apparatus of the present invention, one may resolve the presence of hubs, incompatible routers, and third party devices to produce an accurate representation of the actual network topology.

In the information acquiring step 302, adjacency information for each of the available or accessible ADE nodes is acquired. The adjacency information present at an ADE node is generally comprised of a network adjacency table compiled by and maintained at each of the ADE nodes themselves. While the protocols used to exchange adjacency information between ADE nodes has not been standardized by any national or international body, there are various vendor-specific implementations well known to the skilled in the art.

In the preferred embodiment, each of the ADE nodes is adapted to transmit its adjacency tables to the NMS 114 in response to a Simple Network Management Protocol (SNMP) query, for example, generated by the NMS 114. SNMP and equivalent protocols for requesting and transmitting adjacency information are well-known in the prior art and outside the scope of the present invention.

Figure 4:
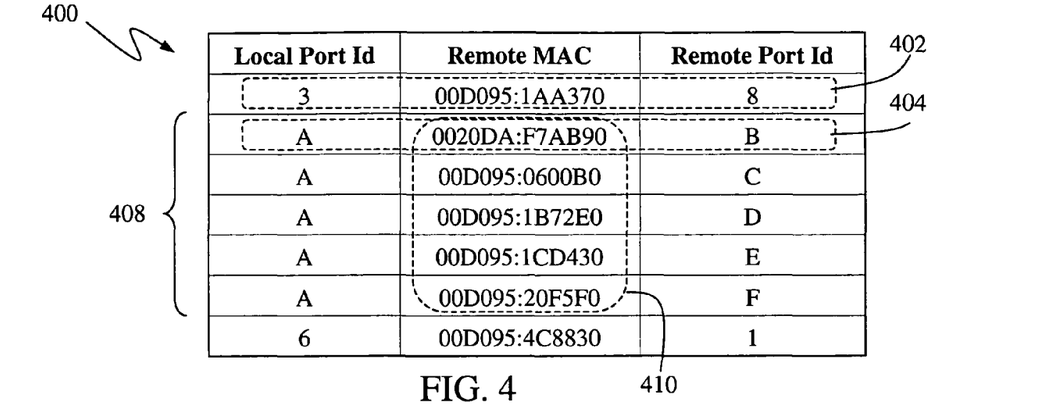
FIG. 4 is an adjacency table of a first network device directly connected to a hub, according to the preferred embodiment of the present invention.
Figure 5:
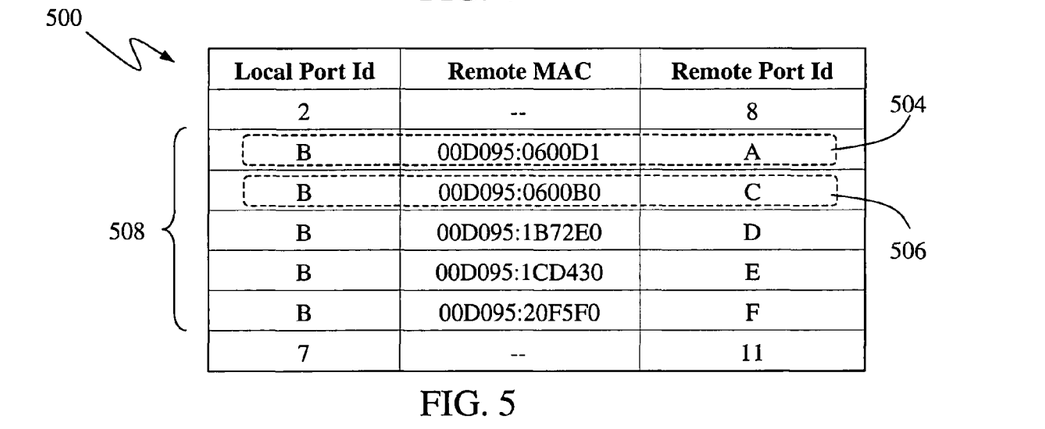
FIG. 5 is an adjacency table of a second network device directly connected to a hub, according to the preferred embodiment of the present invention.
Figure 6:
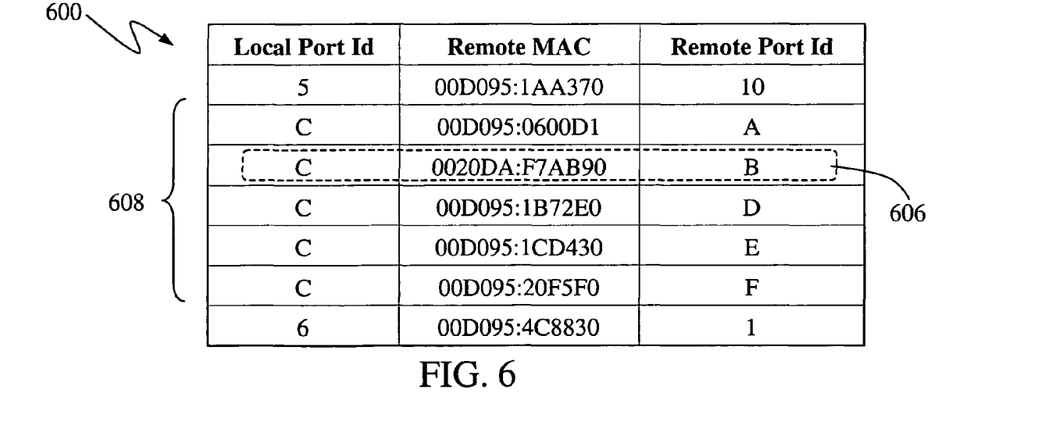
FIG. 6 is an adjacency table of a third network device directly connected to a hub, according to the preferred embodiment of the present invention.

Illustrated in FIGS. 4, 5, and 6 are typical adjacency tables for the first example ADE node 102, the second example ADE node 104, and the third example ADE node 106, respectively. A table preferably associates each local port of a particular ADE node with each of the ADE nodes operatively coupled to that local port. An ADE node is preferably identified by its media access control (MAC) address as well the port of that node to which it is connected, herein referred to as the remote port, to signify the relationship with the particular ADE node.

The adjacency table of a switching device, for example, generally includes at least one entry for each local port linked to an ADE node. If the local port of the switch is coupled to a single ADE node there will generally be only one entry in the table for that local port. As indicated in FIG. 4, the local port 3 of the ADE node 102, for example, is operatively coupled to a single node, namely the device with MAC address 00D095: 1AA370, at the remote port number 8.

If, however, a particular local port of a particular switching device is directly connected to a hub, for example, that is directly connected to a plurality of ADE nodes, there are generally a plurality of entries for that particular local port in the adjacency table. The plurality of entries arise because the adjacency request message transmitted from the local port is forwarded by the connectivity multiplier to each of its ports and received by a number of other ADE nodes. Each of the other ADE nodes responded with an adjacency response message. In first example ADE node 102 table 400, for example, there are five entries for local port A, from which it can be inferred that there is a connectivity multiplier indirectly connecting it to the remaining five example ADE nodes. In the case of the subnet represented by topology display 200, the five nodes are, in fact, the ADE nodes 104-112 represented by the set of five remote MAC addresses 410.

In the absence of any further resolution, it would appear as though the port A of the ADE node 102 were coupled directly to each of the five other ADE nodes 410 indicated in the adjacency table 400. This coupling is illustrated by the pseudo-links 120A-120E. The term pseudo-link used herein refers to representation of a direct link between two nodes where the two nodes are physically linked by means of an intermediate connectivity multiplier. The group of pseudo-links constitute what is termed a pseudo-link set, which is represented is tabular form by bracket 408. The pseudo-links of a pseudo-link 408 set generally share a common connectivity multiplier 240.

One skilled in the art will recognize that the present invention may also be implemented or otherwise embodied using adjacency tables comprising other forms of identifying indicia including IP addresses, for example.

Referring again to FIG. 3, the method of resolving connectivity multipliers proceeds in the identifying step 304 to scan the adjacency table for each of the one or more ADE nodes for one or more pseudo-links sets. As explained above, a pseudo-link set is generally indicated by a plurality of entries for a given local port number. Moreover, one pseudo-link set is readily distinguished from another pseudo-link set by the local port number. Upon completing the identifying step 304, the adjacency table for preferably all of the ADE nodes will have been searched.

In the process of searching each of the adjacency tables, a pseudo-links set will generally appear multiple times. This is due to the fact that each of the ADE nodes directly connected to a connectivity multiplier comprises entries for the same pseudo-links. A pseudo-link associating a local port of a first ADE node with a remote port of a second ADE node also reappears in the adjacency table of the remote ADE node with the designation of local port and remote port reversed. Referring to both FIG. 4 and FIG. 5 for example, the pseudo-link 404 between local port A and remote port B in the adjacency table 400 also appears as pseudo-link 504 between local port B and remote port A in the adjacency table 500 of second example ADE node 104. Similarly, referring to both FIG. 5 and FIG. 6, the pseudo-link 506 between local port B and remote port C in the adjacency table 500 also appears in the adjacency table 600 of the third example ADE node 106 as pseudo-link 606 between local port C and remote port B. In fact, the pseudo-link sets in the adjacency tables of the ADE nodes having a common connectivity multiplier are generally substantially identical. One skilled in the art will recognize that there may be differences in the number of entries, i.e. pseudo-links, in a set as a result of the fact that some entries may age-out or otherwise be removed from the tables upon expiration of an inactivity time limit, for example.

Upon completion of the identifying step 304, substantially all of the one or more connectivity multipliers within the subnet are identified. Each of the one or more connectivity multipliers is associated with a substantially unique pseudo-link set, excluding the repetition of pseudo-link sets for nodes having a common connectivity multiplier.

For each of the unique pseudo-link sets isolated in identifying step 304, a CMI is introduced (step 306). When properly resolved, there is a CMI for each of the connectivity multipliers present in the subnet. For example, the CMI 240 is associated with the six ADE nodes represented by ANIs 102-112. In the preferred embodiment, the CMI 240 is a graphical icon used to depict a hub, for example. The introduced CMIs 306 are generally clustered in a suitable graphical or mathematic representation with the associated ANI introduced (step 308). As illustrated in the preferred embodiment of FIG. 2, the CMI 240 is centrally positioned within a circular or ovular arrangement of associated ANIs, giving rise to a pattern resembling a spoke and wheel.

In the coupling step 310, the fully resolved representation of the one or more CMIs is coupled to the associated ANIs, preferably using a graphical or mathematical depiction referred to herein as a link icon.

Figure 7:
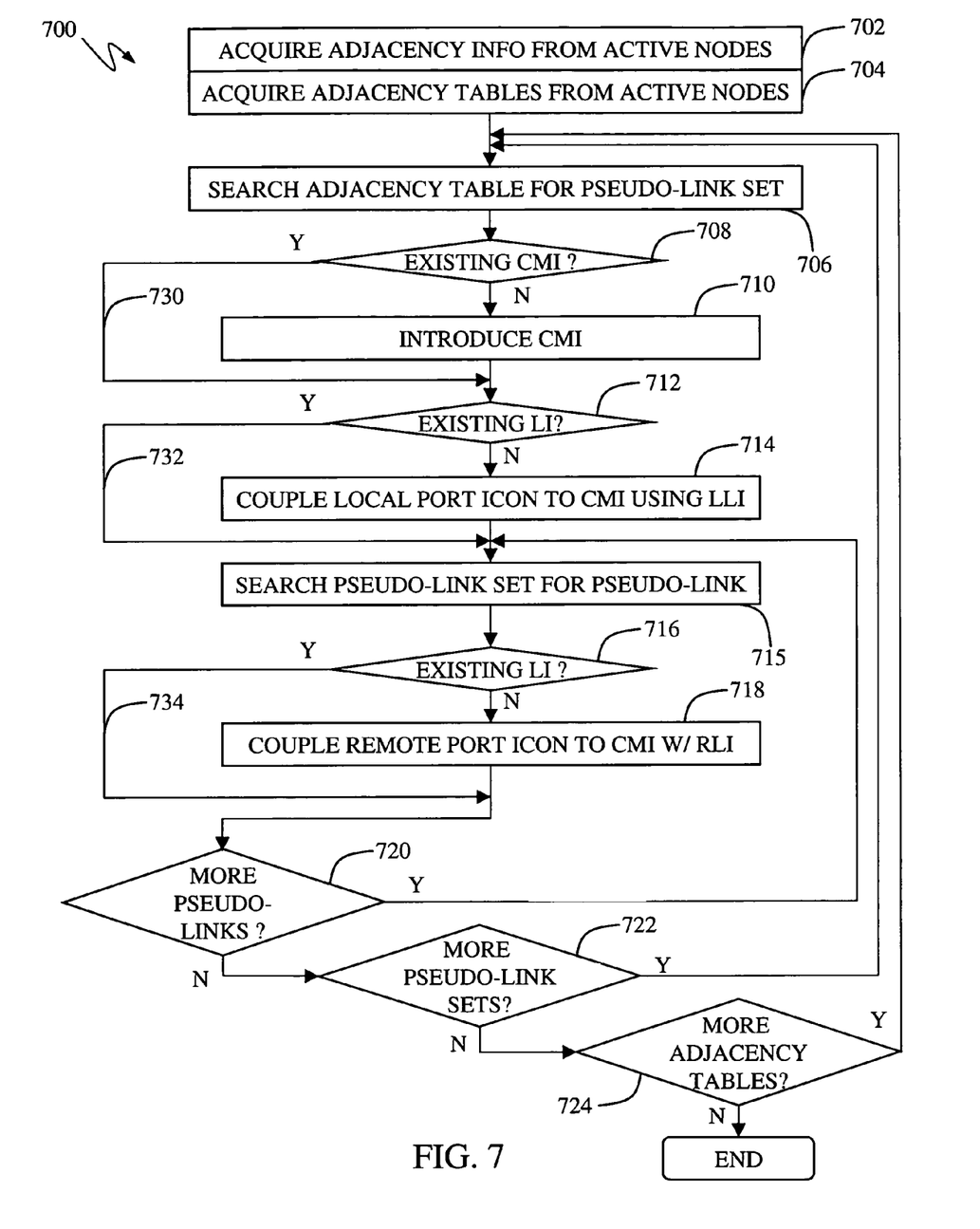
FIG. 7 is a flow chart of the method of resolving link multiplier devices and generating a topology display, according to the preferred embodiment of the present invention.

Illustrated in FIG. 7 is a flow chart of the method of resolving connectivity multiplier devices and generating a topology display. In a first acquiring step 702, the NMS 114 retrieves the adjacency information from the various ADE nodes in the subnet represented by the topology display 200, which generally includes the identity and or addresses of the various nodes that maintain adjacency tables. Once the various ADE nodes in the network are resolved, the network adjacency tables are then retrieved from these ADE nodes in the second acquiring step 704 and returned to the NMS 114.

At the NMS 114, the adjacency tables are scanned for the indicia from which a connectivity multiplier may be inferred and subsequently resolved. In the first iteration of, i.e. the first pass, through the searching step 706, the NMS 114 searches a first adjacency table for a first pseudo-link set corresponding to what may be the first of one or more connectivity multipliers. In the first incidence of the first pseudo-link set, the connectivity multiplier icon (CMI) testing step 708 is answered in the negative, indicating that a CMI has not been previously assigned to the first pseudo-link set. In response, a CMI is introduced or otherwise assigned (step 710).

After the first CMI 240 is introduced (step 710), the link icon (LI) testing step 712 is answered in the negative, indicating that a link icon, including local link icon and remote link icon, as defined below, has not been assigned for this pseudo-link. A local link icon (LLI) is then introduced or otherwise assigned (step 714) to graphically or mathematically couple (step 714) the CMI 240 to the ANI associated with the local port of the first adjacency table. Assuming, for example, that the first adjacency table 400 corresponds to the ADE node represented by the first example ANI 102, the LLI 230 serves to couple the first example ANI 102 to the CMI 240. As described below, the LLI will be different for each adjacency table.

After the first CMI 240 is introduced (step 710) and the LLI introduced (step 714), the first pseudo-link set is searched (step 715) for purposes of identifying each pseudo-link contained therein. In the first incidence of the first pseudo-link set, the remote link icon testing step 716 is answered in the negative, indicating that a remote link icon (RLI) for coupling the CMI to the remote port associated with the first adjacency table entry has not been assigned. In response, a RLI is introduced to graphically or mathematically couple (step 718) the CMI 240 to a first remote port from the first adjacency table. Assuming that the first adjacency table 400 corresponds to the first example ANI 102 and the first adjacency table entry 404 in pseudo-link set 408 corresponds to the second example ANI 104, a RLI 230 is introduced to couple the second example ANI 104 to the CMI 240.

The pseudo-link testing step 720 is then used to determine whether there are any additional adjacency table entries in the pseudo-link set, i.e. whether there are any additional RLIs to be introduced. If there are additional table entries, the pseudo-link testing step 720 in answered in the affirmative, and RLI coupling is repeated for the remaining entries. In particular, the pseudo-link searching step 715 and RLI coupling step 718 are repeated until the CMI 240 is coupled to each of the remaining example ANIs 106-112 by means of a link icon, namely RLIs 232-235, respectively.

After all the pseudo-links of the first pseudo-link set 408 are processed in the manner above, the pseudo-link set testing step 722 is then used to determine whether there are any additional pseudo-link sets within the first adjacency table 400. Until each pseudo-link set is processed, the pseudo-link set testing step 722 is answered in the affirmative and the process repeated beginning with the searching step 706.

After each of the pseudo-link sets of the first adjacency table 400 are processed in the manner described above, the adjacency table testing step 724 is used to determine whether there are any additional adjacency tables to be processed. Until the last adjacency table is processed, the adjacency table testing step 724 is answered in the affirmative and the process repeated beginning with the searching step 706 using the next adjacency table.

Assuming for illustration, that the processing of the first adjacency table 400 is complete and a second adjacency table 500 is undertaken. The second adjacency table 500 preferably corresponds to the ADE node associated with the second example ANI 104. In this situation, care must be taken to avoid introducing another CMI where the first CMI 240 has been previously assigned. In particular, the CMI testing step 708 is answered in the affirmative when, for example, the pseudo-link set 508 of the second adjacency table 500 is processed subsequent to the same pseudo-link set 408 represented in the first adjacency table 400, thereby avoiding 734 introduction of a duplicate CMI. In accordance with the process 700, the CMI testing step 708 prevents all duplicate CMIs from being introduced for all pseudo-link sets across the plurality of adjacency tables processed.

Continuing with the example immediately above, the link icon testing step 712 prevents 732 a LLI from being introduced in LLI coupling step 714 if the same link icon was previously introduced when processing the same pseudo-link set in a previous adjacency table. For example, the introduction of the RLI 231 while processing the first adjacency table 400 obviates the need to introduce a LLI when processing the second adjacency table 500. The presence of the link icon 231 is, therefore, an existing link icon that would cause the link icon testing step 712 to be answered in the affirmative. In this manner, each ANI is couple to the corresponding CMI only once.

In the pseudo-link searching step 715, the NMS 114 proceeds to identify pseudo-links for purposes of introducing a link icon. Assuming that the second adjacency table 500 is being processed, the existing LI testing step 716 will reveal that each of the LIs 230 and 232-235 was previously introduced while processing the pseudo-link set 408 of the first table 400. As such, the link icon testing step 716 is answered in the affirmative each time, thereby avoiding 734 the introduction of duplicate link icons.

The connectivity multiplier resolution method 700 proceeds to process the adjacency tables of each of the ADE nodes in the network until each one of the connectivity multipliers is resolved. Upon completion of the resolution method 700, the topology display 200 is generated and the CMI 240 coupled to each of the ANIs 102-112 in a manner that is substantially identical to the physical connectivity of the corresponding subnet.

While one skilled in the art will recognize that the RLI coupling step 718 is not strictly necessary, it provides some assurance that the link icon to a particular ADE node is included in the topological display even when its adjacency table is not processed because, for example, the particular ADE node was unavailable or unreachable. Moreover, the various algorithmic nested-loops from which the method is comprised may be executed in any particular order.

One skilled in the art will also recognize that the adjacency table and method of the present invention may be based upon alternative forms of identification without varying from the scope of the invention. A port may be represented by its slot and port identifiers or if index, for example. A remote device may also be represented by an IP address or system name, for example. Conversion tables may be used to translate between the MAC Address of a device and the device IP address, and between the port numbers and corresponding physical ports, as needed. Local Device identifiers, i.e., the MAC Address or other identifying information, can be obtained from the device whose adjacency tables are being processed.

Figure 8:
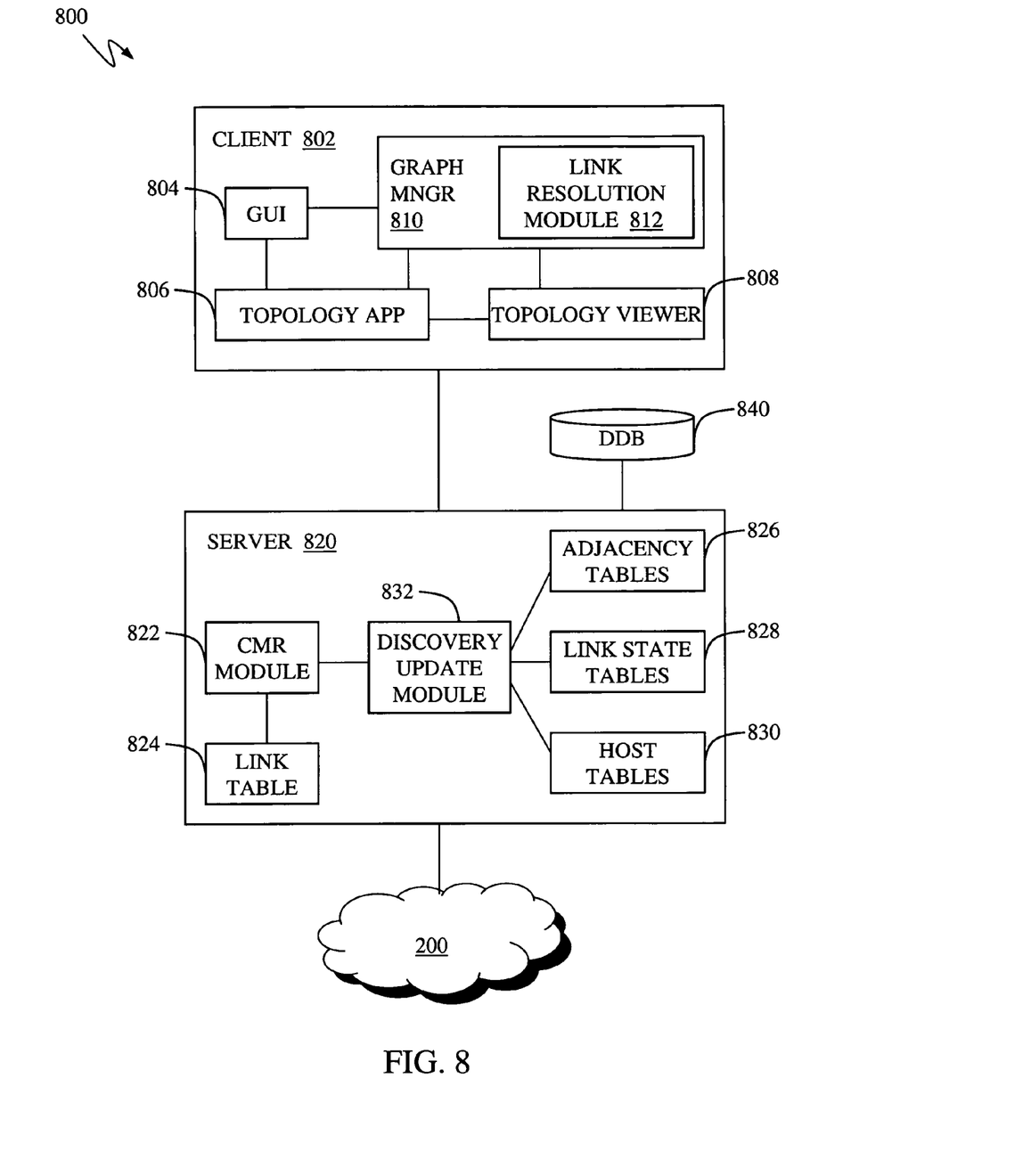
FIG. 8 is a functional block diagram of the apparatus for resolving link multiplier devices and generating a topology display, according to the preferred embodiment of the present invention.

Illustrated in FIG. 8 is a functional block diagram of the apparatus for resolving link multiplier devices and generating a topology display. The apparatus 800 preferably includes a client computer 802 with which a network administrator observes the network topology as well as a server 820 with access to the plurality of ADE and non-ADE network devices.

The server 820 maintains information pertaining to one or more network nodes including the adjacency tables of the individual ADE nodes and the current state of each link, i.e., whether the link is operational or non-operational. The individual adjacency tables retained in discovery database 840 are compiled by server 820 into what is referred to herein as a system-wide, master adjacency table 826 comprising the adjacency table data of the various ADE nodes. The reports relating to the link states returned by the various network nodes are compiled by server 820 into what is referred to herein as a master link state table 828. In addition, the server 820 also maintains a master host table 830 that relates MAC address of each network node to one or more corresponding IP addresses. The information from the adjacency tables 826, link state tables 828, and host tables 830 are generally acquired using one or more link discovery routines executed by the discovery update module 832, which preferably identifies IP links and Private Network to Node Interface (PNNI) links used in Asynchronous Transfer Mode (ATM) Networks.

The adjacency tables 826 are then processed by a connectivity multiplier resolution (CMR) module 822 in the manner described above to identify, among other things, the presence of connectivity multipliers in the network. The list of nodes in the network, including ADE nodes and multipliers, is then synthesized into link table 824 made available to a client computer 802. The client 802 preferably comprises a graphic user interface (GUI) 804, graph manager 810, topology application 806, and a topology viewer 808. The graph manager 810 generally receives the link table 824 and generates a graphic model representing the network topology comprising each of the nodes therein. The graph model preferably includes a list of all the nodes present in the subnet 200, a map of the physical topology of the subnet 200, as well as one or more identifiers used to associate one or more users in the network with one or more organizational entities present in the enterprise. With the information, the link resolution module executes the method of the present invention to detect and resolve the presence of the passive non-ADE devices present in the subnet 200, including both hubs and third-party devices.

The topology application 806 of the preferred embodiment maintains the display of topology map and manages all new updates received from the server regarding the switch status and the user actions including zooming into and out of the topology display and selecting a different network to view. The topology viewer 808 of the preferred embodiment then displays the graph model as a GUI 804 for the user. The various network devices are represented as node icons, including ADE node icons and connectivity multiplier icons, that are interconnected by link icons consistent with the graph model. In the preferred embodiment, for example, the user may select a subnet to view through the topology application 806, which passes the subnet context to the topology viewer 808. The topology viewer 808 determines the devices or icons needed to display the subnet and requests the links information from the graph manager 810. The topology viewer 808 then renders the topology map on the screen using GUI components.

One skilled in the art will recognize that the server 820 may also serve as client 802 for purposes of performing link resolution and topology display. One skilled in the art will also recognize that one or more steps practices by the apparatus, module, or method of the present invention may be implemented in software running in connection with a programmable microprocessor; implemented in hardware utilizing either a combination of microprocessors or other specially designed application specific integrated circuits and programmable logic devices; or various combinations thereof. Thus, embodiments of the invention are not limited to any specific combination of hardware circuitry and software.

In some embodiments, the methods of the present invention are performed by one or more multi-layer switching device, as defined by the Open Systems Interconnect (OSI) reference model, executing sequences of instructions retained in memory at the device or in another computer-readable medium. The term computer-readable medium as used herein refers to any medium that participates in providing instructions to one or more processors for execution. Such a medium may take many forms, including but not limited to, non-volatile media and volatile media. Non-volatile media includes, but are not limited to, hard disks, optical or magnetic disks, floppy disks, magnetic tape, or any other magnetic medium, CD-ROMs and other optical media, for example. The one or more processors and computer-readable medium may be embodies in one or more devices located in proximity to or remotely from the network administrator viewing the topology display.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A method of resolving a connectivity multiplier operably coupled to three or more adjacency-detection enabled (ADE) nodes, wherein each of the three or more ADE nodes is associated with an ADE node icon, the method comprising the steps of: (a) acquiring adjacency information from each of the three or more ADE nodes, wherein said adjacency information is at least partially derived from said three or more ADE nodes each responding to a respective adjacency request during a current discovery occurrence, wherein the connectivity multiplier forwards said adjacency requests without responding to any one of said adjacency requests during the current discovery occurrence such that the connectivity multiplier is not an ADE device during the current discovery occurrence and wherein the connectivity multiplier is an ADE node that responds to adjacency requests during a different discovery occurrence; (b) identifying a pseudo-link set from the adjacency information, each unique pseudo-link set comprising at least one pseudo-link associating a pair of ADE nodes; (c) coupling all of said three or more ADE node icons directly and only to a single connectivity multiplier icon; and (d) providing a viewable graphic display representing a subnet topology including said three or more ADE nodes, wherein the viewable graphic display includes the single connectivity multiplier icon, the ADE icon associated with each one of said ADE nodes, and all of said ADE node icons directly and only connected to the connectivity multiplier icon by a respective single link icon, wherein the respective single link icon directly connected between the connectivity multiplier icon and each one of said ADE node icons is derived from the pseudo-link set, wherein the connectivity multiplier icon is a graphical representation of the connectivity multiplier, and wherein the connectivity multiplier in combination with said link icons visually depict ADE node connectivity functionality provided by the connectivity multiplier and said pseudo-link set.

2. The method of claim 1, wherein the adjacency information from each of the three or more ADE nodes comprises a plurality of entries, each entry associating a local port of a current ADE node with an adjacent ADE node.

3. The method of claim 2, wherein identifying step further includes the step of searching the adjacency information for a first port of a first ADE node of the three or more ADE nodes that is associated with two or more adjacent ADE nodes.

4. The method of claim 3, wherein the first port is characterized by a local port number, and each of the ADE nodes adjacent to the first ADE node are characterized by a media access control (MAC) address and a remote port number.

5. The method of claim 1, wherein the connectivity multiplier icon is one of a plurality of graphical icon in a graphical user interface (GUI) representing a topology of the network.

6. The method of claim 1, wherein the connectivity multiplier is a hub.

7. The method of claim 1, wherein the connectivity multiplier is a router enabled with an adjacency detection protocol incompatible with the three or more ADE nodes.

8. The method of claim 1, wherein the connectivity multiplier is a third-party network device.

9. An apparatus from which computer-readable instructions for resolving a connectivity multiplier operably coupled to three or more adjacency-detection enabled (ADE) nodes are accessible by a computer, wherein each of the three or more ADE nodes is associated with an ADE node icon, the instructions comprising the steps of: (a) acquiring adjacency information from each of the three or more ADE nodes, wherein said adjacency information is at least partially derived from said three or more ADE nodes each responding to a respective adjacency request during a current discovery occurrence, wherein the connectivity multiplier forwards said adjacency requests without responding to any one of said adjacency requests during the current discovery occurrence such that the connectivity multiplier is not an ADE device during the current discovery occurrence and wherein the connectivity multiplier is an ADE node that responds to adjacency requests during a different discovery occurrence; (b) identifying a pseudo-link set from the adjacency information, each unique pseudo-link set comprising at least one pseudo-link associating a pair of ADE nodes; (c) coupling all of said three or more ADE node icons directly and only to a single connectivity multiplier icon; and (d) providing a viewable graphic display representing a subnet topology including said three or more ADE nodes, wherein the viewable graphic display includes the single connectivity multiplier icon, the ADE icon associated with each one of said ADE nodes, and all of said ADE node icons directly and only connected to the connectivity multiplier icon by a respective single link icon, wherein the respective single link icon directly connected between the connectivity multiplier icon and each one of said ADE node icons is derived from the pseudo-link set, wherein the connectivity multiplier icon is a graphical representation of the connectivity multiplier, and wherein the connectivity multiplier in combination with said link icons visually depict ADE node connectivity functionality provided by the connectivity multiplier and said pseudo-link set.

10. The apparatus of claim 9, wherein the connectivity multiplier is selected from the group consisting of: hub, router, and third-party device.

11. The apparatus of claim 9, wherein identifying step further includes the step of searching the adjacency information for a first port of a first ADE node of the three or more ADE nodes that is associated with two or more adjacent ADE nodes.

12. A system for resolving a connectivity multiplier operably coupled to three or more adjacency-detection enabled (ADE) nodes, wherein each of the three or more ADE nodes is associated with an ADE node icon, the system adapted to: (a) acquire adjacency information from each of the three or more ADE nodes, wherein said adjacency information is at least partially derived from said three or more ADE nodes each responding to a respective adjacency request during a current discovery occurrence, wherein the connectivity multiplier forwards said adjacency requests without responding to any one of said adjacency requests during the current discovery occurrence such that the connectivity multiplier is not an ADE device during the current discovery occurrence and wherein the connectivity multiplier is an ADE node that responds to adjacency requests during a different discovery occurrence; (b) identify a pseudo-link set from the adjacency information, each unique pseudo-link set comprising at least one pseudo-link associating a pair of ADE nodes; (c) couple all of said three or more ADE node icons directly and only to a single connectivity multiplier icon; and (d) provide a viewable graphic display representing a subnet topology including said three or more ADE nodes, wherein the viewable graphic display includes the single connectivity multiplier icon, the ADE icon associated with each one of said ADE nodes, and all of said ADE node icons directly and only connected to the connectivity multiplier icon by a respective single link icon, wherein the respective single link icon directly connected between the connectivity multiplier icon and each one of said ADE node icons is derived from the pseudo-link set, wherein the connectivity multiplier icon is a graphical representation of the connectivity multiplier, and wherein the connectivity multiplier in combination with said link icons visually depict ADE node connectivity functionality provided by the connectivity multiplier and said pseudo-link set.

13. A method for improving a graphical representation to a network manager of a topology of a network comprising a plurality of adjacency-detection enabled (ADE) nodes operably coupled via a connectivity multiplier, the method comprising the steps of: (a) acquiring adjacency information from a first ADE node of the network, wherein said adjacency information is at least partially derived from the plurality of ADE nodes each responding to a respective adjacency request during a current discovery occurrence, wherein the connectivity multiplier forwards said adjacency requests without responding to any one of said adjacency requests during the current discovery occurrence such that the connectivity multiplier is not an ADE device during the current discovery occurrence and wherein the connectivity multiplier is an ADE node that responds to adjacency requests during a different discovery occurrence; (b) identifying a pseudo-link set from the adjacency information, the pseudo-link set comprising a first pseudo-link between a port on the first ADE node and a second ADE node and a second pseudo-link between the port and a third ADE node, wherein said identifying includes identifying in two associated adjacency tables a repeat entry for a given local port identifier; and (c) graphically linking the first ADE node linked with the second ADE node and third ADE nodes via a single connectivity multiplier icon, wherein graphically linking said ADE nodes includes providing a viewable graphic display representing a subnet topology including said three or more ADE nodes, wherein the viewable graphic display includes the single connectivity multiplier icon, an ADE icon associated with each one of said ADE nodes, and all of said ADE node icons directly and only connected to the connectivity multiplier icon by a respective single link icon, wherein the respective single link icon directly connected between the connectivity multiplier icon and each one of said ADE node icons is derived from the pseudo-link set, wherein the connectivity multiplier icon is a graphical representation of the connectivity multiplier, and wherein the connectivity multiplier in combination with said link icons visually depict ADE node connectivity functionality provided by the connectivity multiplier and said pseudo-link set.

* * * * *